Aug. 19, 1930.   W. M. BAGER ET AL   1,773,253
CREEPING TRACTION MOUNTING
Filed May 15, 1925   4 Sheets-Sheet 1

William M. Bager.
Werner Lehman.   INVENTOR.

BY
Roger Sherman Hoar ATTORNEY.

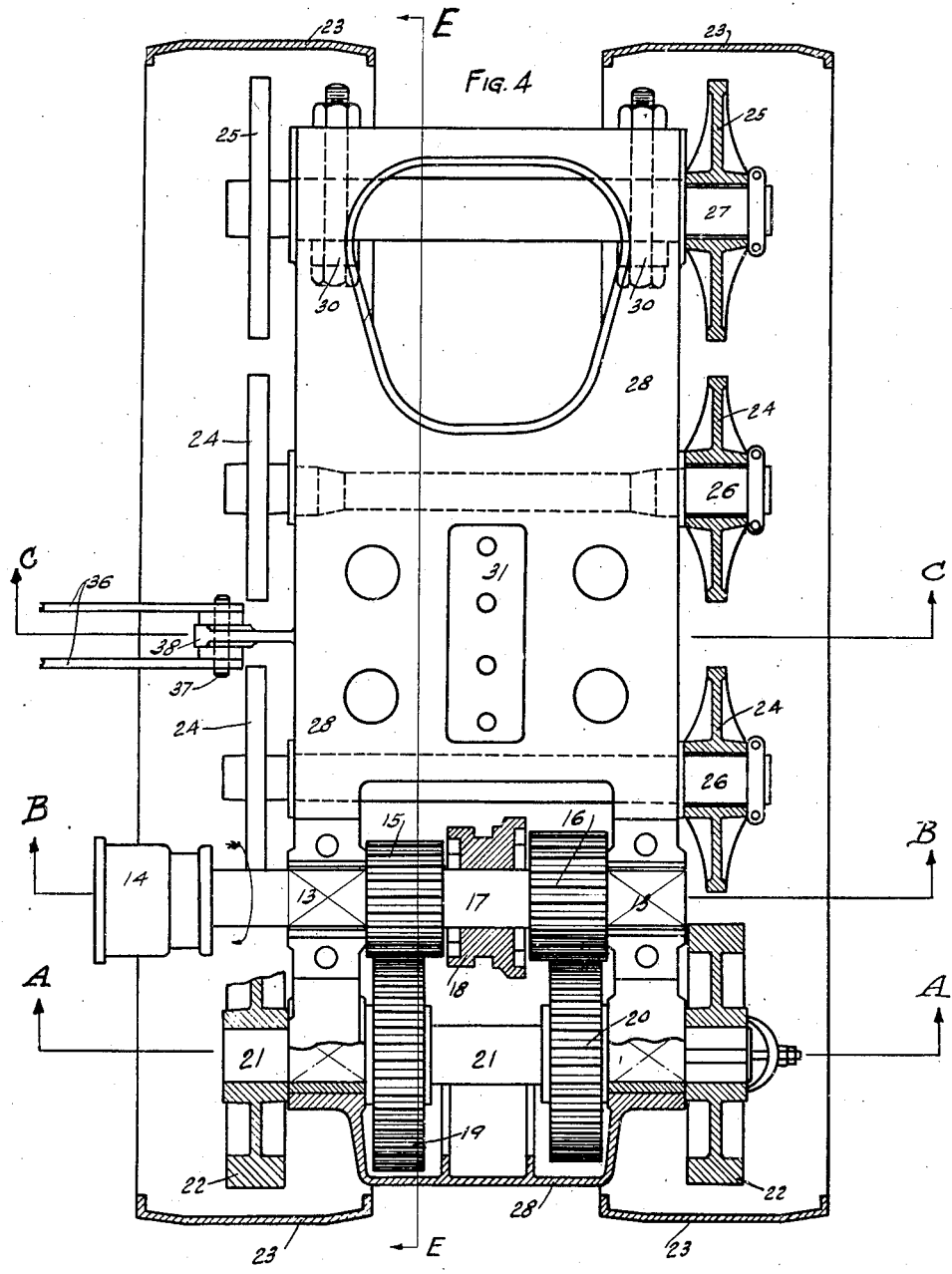

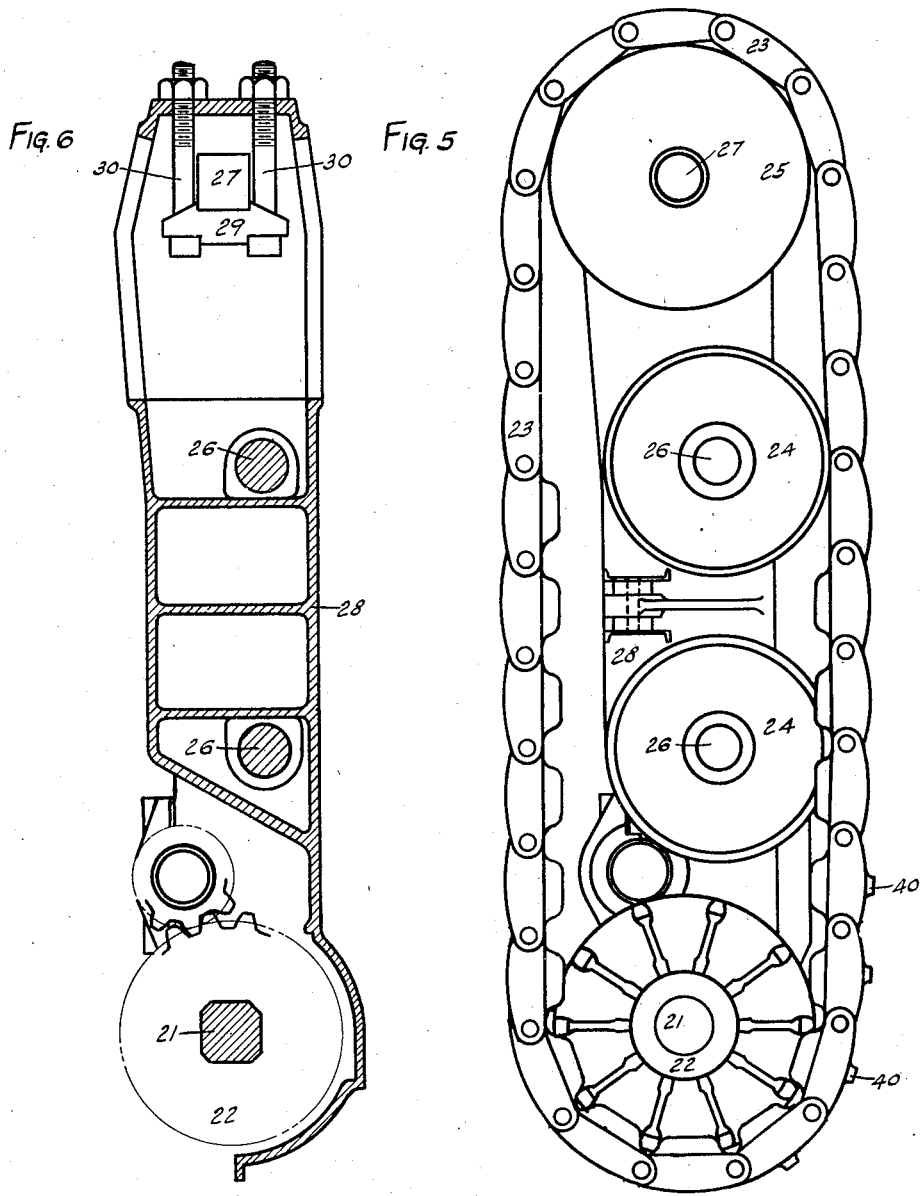

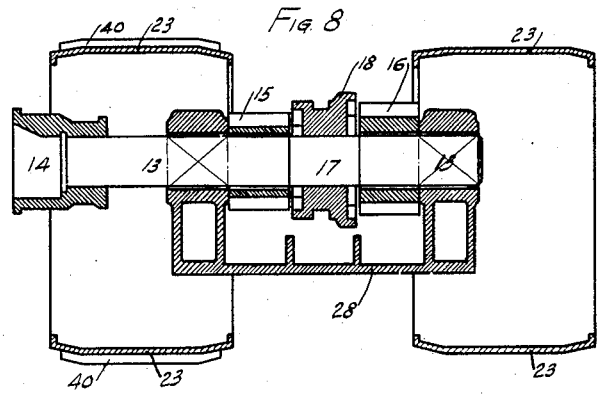
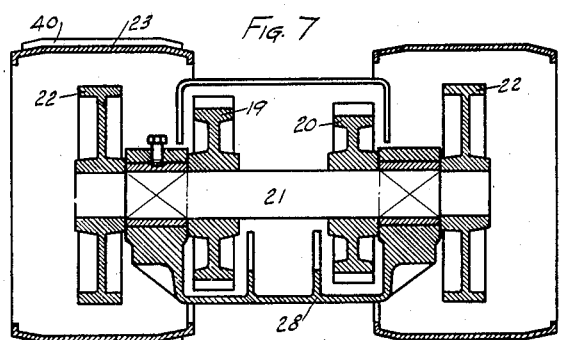
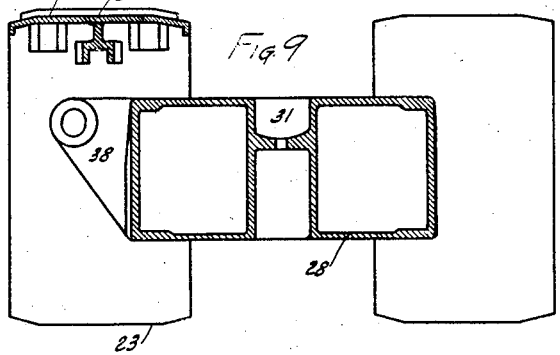

Patented Aug. 19, 1930

1,773,253

UNITED STATES PATENT OFFICE

WILLIAM M. BAGER AND WERNER LEHMAN, OF SOUTH MILWAUKEE, WISCONSIN, ASSIGNORS TO BUCYRUS-ERIE COMPANY, OF SOUTH MILWAUKEE, WISCONSIN, A CORPORATION OF DELAWARE

CREEPING TRACTION MOUNTING

Application filed May 15, 1925. Serial No. 30,552.

Our invention relates to new and useful improvements in creeping traction mounting, for heavy, unwieldy portable machinery and the like; and has for its principal object to provide a creeping traction mounting that is easily operable, easy to steer, rugged in construction, and consisting of relatively few parts. It should be pointed out that the particular machine, for which this creeping traction mounting was designed, weighs in the neighborhood of 350 tons and in addition must sustain heavy digging reactions; thus it presented new problems of constrution, design, stability, strength, and control, never before met with in the creeping traction art.

Further objects of our invention are as follows: to provide a novel three-point support for a machine of the class described; to provide a novel and economical means for the distribution of power to the creeping traction units; to provide units which will independently conform to the surface of the ground; to provide means to keep these units in alignment; to provide a novel, sturdy and compact assembly for each of these units; to provide a novel arrangement of cleats on the treads; and to provide a novel self-contained means for controlling the speed of each unit, independently of that of each other unit, although all are driven from a common power source, thereby effecting a novel and convenient steering mechanism.

The chief disadvantages with all creeping traction mountings prior to that herein claimed have been: less ease of operation, a greater complexity of the steering mechanism causing a difficulty of manipulating the machine or the like carried by the creeping traction mounting, less rugged construction, and a greater number of parts.

Other advantages of the simple design of our creeping traction mounting will naturally suggest themselves as the description progresses. It is within the province of the disclosure to improve generally and to enhance the utility of devices of that type to which the invention appertains.

With these general objects in view, the invention resides in the novel features of construction, combination and arrangement of parts which will be hereinafter more particularly described and claimed, and shown in the accompanying drawings, wherein:

Figure 4 is a detail plan and section view of one typical unit, for example, the unit shown in the upper right hand of Figure 1.

Figure 5 is a side elevation of one unit.

Figure 6 is a sectional elevation of frame, along the line E E of Figure 4, showing in particular the device for taking-up the tread belt, which device is specifically described and claimed in our copending application, Serial Number 79,162, filed January 4, 1926, for excavating machinery.

Figures 7, 8 and 9 are sectional elevations respectively along the lines A A, B B, and C C, of Figure 4.

Figure 1:
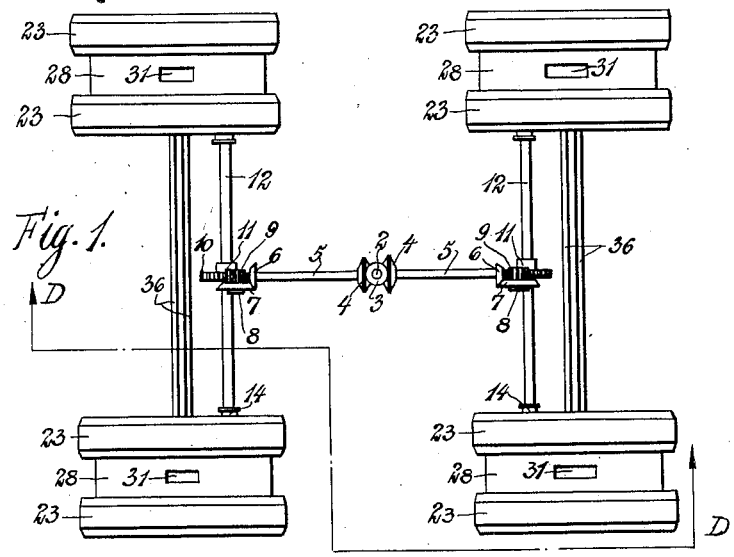
Figure 1 is a more or less conventionalized plan view of all four units of our creeping traction mounting.

Referring more particularly to the drawings, it will be seen that 1 represents a sturdy base frame, supported by the four traction units. Revolvably supported upon frame 1, is a turntable (not shown), carrying the main driving machinery (not shown), and excavating or other machinery (not shown).

Through the central pivot of the turntable passes a vertical shaft 2, carrying a bevel pinion 3, which meshes with two bevel gears 4, each of which is keyed to a shaft 5. Each shaft 5 has keyed upon its other end a bevel pinion 6, which meshes with a bevel gear 7, keyed on a countershaft 8. Also keyed on each of the countershafts 8 is a pinion 9, which meshes with a gear 10. Integral with each of the two gears 10 are two universal joints 11, each of which drives a wobbler shaft 12. Each of the four wobbler shafts 12 drives a shaft 13 through a universal joint 14. Gears 4, 7, and 10, and pinions 6 and 9 are carried by the frame 1 in any convenient manner.

Running idle on each shaft 13, are a relatively small pinion 15 and a relatively large pinion 16. The portion 17 of shaft 13 lying between pinions 15 and 16 is machined square, and carries longitudinally slidable thereon a selective clutch 18. This clutch may be manipulated in any convenient manner.

Pinion 15 meshes with a relatively large gear 19, and pinion 16 meshes with a relatively smaller gear 20. These gears 19 and 20 are both keyed or splined to a shaft 21, so as to move integrally with it. This shaft 21 carries upon each end, and rigidly attached thereto, a driving tumbler 22. Each driving tumbler 22 engages with and drives the creeping traction tread-belt 23 of one unit.

On each tread-belt 23 run two rollers 24 and one non-driving tumbler 25, journally carried on shafts 26 and 27 respectively. The tread-belt rollers and tumblers may be of any corvenient form.

Each of the four creeping traction units is assembled upon one rigid frame casting 28. Shafts 13 and 21 are journally mounted on the frame casting 28. The two shafts 26 are rigidly mounted in the frame casting 28. Shaft 27 is mounted in the frame casting 28 in such a manner that it can be slid fore and aft by yokes 29 and bolts 30, whereby the tension in the creeping traction treadbelt can be adjusted.

Each frame 28 carries on its upper surface a recess 31. From one side of the main frame 1, and rigidly attached thereto, depend two brackets 32 engaging the recesses 31 of the two traction units on that side of the machine. Under the other side of the main frame 1 and pivoted at its center point 39 in any convenient manner in the equalizing beam 33. At each end of the equalizing beam 33 and rigidly attached thereto is a bracket 34 engaging the recesses 31 in the two traction units on the corresponding side of the machine.

Between the ends of the equalizing beam 33 and the frame 1 are jackscrews 35 operated in any convenient manner.

The two traction units at the forward end of the machine are connected to each other by a strut 36, each end of which strut is pivotally connected to one traction unit, each connection being made by a horizontal pin 37 to an ear 38, which ear is an integral part of the frame 28. A similar strut connects the two traction units at the rear end of the machine, and is similarly connected to those units. The object of these struts is to keep the traction units parallel, while permitting to each unit a reasonable degree of rocking about the recess 31, so that the treads may conform to the surface of the ground. Further conformity is attained by the three-point support of the frame 1, namely, the two brackets 32 and the central pivot of the equalizing beam 33.

When the machine, such as an excavator or the like, is working, and it is desired rigidly to support the same on the ground, the jackscrews 35 may be tightened. Other equalizing means, such as hydraulic equalizers, may be substituted for the equalizing beam and jackscrews above described.

On each link of one endless tread-chain only of each creeping traction unit, there is a transverse cleat 40, for the purpose of obtaining a purchase on slippery ground. The reason for having cleats on one chain only of each unit, is that otherwise there would be too much resistance to turning, during steering as herein described.

Figures 2, 3:
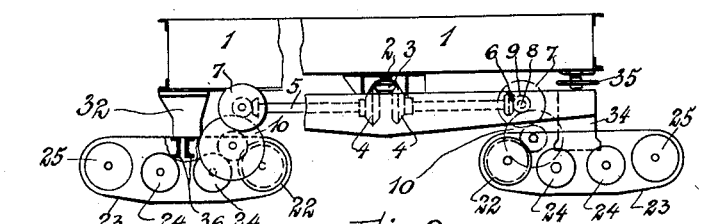
Figure 2 is a sectional elevation of two of the units of our creeping traction mounting, shown in position under the base of the machine, the section being taken along the line D D of Figure 1.
Figure 3 is a front elevation of two of the units of our creeping traction mounting, shown in position under the base of the machine, the struts connecting the traction units being omitted.
Figure 10:
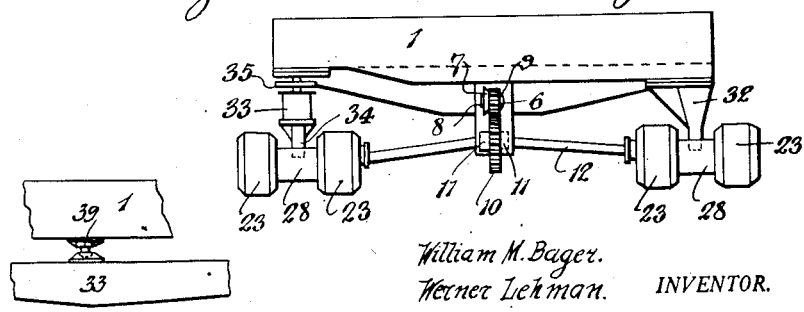
Figure 10 shows the pivotal connection at the center point of the equalizer beam of Figure 2.

When the central shaft rotates clockwise, as seen from above, shaft 13 will rotate in the direction of the arrow shown drawn about shaft 13 in Figure 4. In consequence, all units will propel forward, the word "forward" being understood, with respect to Figures 1, 2 and 4, to mean toward the top of the page. When the clutch 18 engages pinion 15, the traction unit propels forward at a relatively slow rate of speed. When the clutch 18 engages pinion 16, the unit propels forward at a relatively fast rate of speed. When the clutch does not engage either of the pinions 15 and 16, the traction unit does not drive, but is free to move if the motion of the other units so requires.

When, in all four traction units, the clutch 18 engages the pinion 15, the machine will travel forward in a straight line at a relatively slow speed.

When, in all four units, the clutch 18 engages the pinion 16, the machine will travel forward in a straight line at a relatively high speed.

If the left rear traction unit is not driven, while the left forward and right rear units are clutched to slow speed and at the same time the right forward unit is put on full speed, the machine will make its sharpest turn to the left, approximately turning upon the unit at left rear as a heel.

If the left forward traction unit is not driven, while at the same time the left rear and right forward units are in slow speed and the right rear unit in high speed, a similar sharp turn to the left will result, except that it will be approximately about the left forward unit as a heel.

If both the left side units are in slow speed and both the right side units in high speed, the machine will make a curve of relatively larger radius to the left.

If in the preceding paragraphs in the description of the speeds of the units, the word "right" be substituted for "left" and the word "left" for "right", the corresponding turns of the machine will be to the right.

Although we have shown and described, as to each traction unit, a change-speed gearing having merely two speeds and neutral, we do not intend to be limited thereto, as it is within the scope of our invention to add other speeds, or to substitute graduated speed-change mechanism of the hydraulic or other familiar type.

Reversal of direction of motion is accomplished by reversing the direction of rotation of the vertical shaft 2, by any convenient means (not shown) on the vertical frame.

It will therefore be seen that, owing to the separate speed controls of each of the four traction units, our invention gives much greater possibilities of manipulation of the machine mounted upon our creeping traction units than has been heretofore attained, while remaining easy of operation and rugged in construction, owing to the fact that the construction consists of relatively few parts.

It is also obvious that our four creeping traction units are eminently adapted to travelling over irregular ground, while at the same time, owing to the equalizer beam and the three-point support, carrying in a rigid, firm and non-rocking manner, the excavating machinery or other load which is mounted thereon.

Thus it will be seen that, in our invention, the power is distributed from a central source to the four creeping traction units with a minimum of gears and shafts. It will be seen that each creeping traction unit is of compact and sturdy construction, and has its own self-contained change-speed gearing. It will be seen that each unit is so pivoted that it will conform to irregularities of the surface of the ground within reasonable limits, while guarded, by our peculiar construction, from all danger of slewing or overturning. It will be seen that the whole system can conform to the surface of the ground, by virtue of the three-point support provided.

This last feature demands some further discussion, as it may seem strange that the construction is made symmetrical with respect to its transverse center line, rather than with respect to its fore-and-aft center line. The reasons are as follows: The equalizer beam does not need to be bridged over the tread part of two traction units as it would if it were transverse, and it may therefore be simpler in construction. Nor would the simple method of distribution of power described in this application be possible with a transverse equalizer beam. Also, the struts, being transverse, will provide better bracing to the machine than if longitudinal.

We do not intend to be limited to the particular foregoing exemplification of our invention, but rather intend to avail ourselves of all equivalents.

Claims to the creeping-traction belt take-up feature shown in this application are included in our co-pending application, Serial No. 79,162, filed January 4, 1926.

We claim:

1. In a machine mounted on creeping traction units, the combination of a main base frame and creeping traction units supporting said main base frame, each unit including a single integral unit frame casting, a shaft journally mounted in said casting, two driving tumblers keyed to said shaft, a plurality of shafts fixed in said casting each carrying two rollers journally mounted thereon, a shaft mounted to slide lengthwise of said casting and carrying two idling tumblers journally mounted thereon, means for adjustably holding said last named shaft, two endless treadbelts, on each of which runs one of each pair of said tumblers and rollers, change speed mechanism within said unit frame casting, and means for controlling said change speed mechanism.

2. In a machine mounted on creeping traction units, the combination of a main base frame and creeping traction units supporting said main base frame, each unit including a single integral unit frame casting, a shaft journally mounted in said casting, two driving tumblers keyed to said shaft, a plurality of shafts fixed in said casting each carrying two rollers journally mounted thereon, a shaft non-rotatably mounted in said casting and carrying two idling tumblers journally mounted thereon, two endless treadbelts, on each of which runs one of each pair of said tumblers and rollers, change speed mechanism within said unit frame casting, and means for controlling said change speed mechanism.

3. In a machine mounted on creeping traction, the combination of: a main base frame; a revolving turn-table frame mounted thereon; four creeping traction units supporting said main base frame; a power source mounted on said revolving turn-table frame; a vertical shaft extending through the pintle of said revolving turn-table frame, for conveying power from said source to a central point below said frame; two shafts for conevying power fore and aft from said last named shafts to two points between respective pairs of creeping traction units; and four shafts for conveying power transversely from said last named shafts to the respective creeping traction units, to drive the same; together with the necessary gears for conveying power from shaft to shaft in the order named, and the necessary universal joints for conveying power from the last named four shafts to the respective creeping traction units; each unit including a driving shaft; means whereby said shaft receives power from without said unit; two pinions, of different diameter one from the other, free to rotate on said shaft but constrained against motion lengthwise thereof; each pinion carrying a clutch-face; a two-faced clutch-member located between said pinions, and constrained to rotate with said shaft but free to slide thereon; means for sliding said clutch-member into selective engagement with the clutch-face of either or neither of said pinions: a driven shaft, rigidly carrying two gears, in engagement each with one of said pinions; and one or more endless traction belts driven by said driven shaft.

WILLIAM M. BAGER.
WERNER LEHMAN.